United States Patent [19]

Martinez

[11] Patent Number: 4,527,209
[45] Date of Patent: Jul. 2, 1985

[54] CASSETTE EJECTOR MECHANISM

[75] Inventor: Arthur T. Martinez, Long Beach, Calif.

[73] Assignee: T.A.D. Avanti, Inc., Compton, Calif.

[21] Appl. No.: 383,561

[22] Filed: Jun. 1, 1982

Related U.S. Application Data

[63] Continuation-in-part of Ser. No. 202,785, Oct. 31, 1980, abandoned.

[51] Int. Cl.³ .............................................. G11B 15/66
[52] U.S. Cl. ..................................................... 360/96.5
[58] Field of Search ...................... 360/96.5, 96.6, 137

[56] References Cited

U.S. PATENT DOCUMENTS 3,947,884  3/1976  Yokota et al. ..................... 360/96.6
4,017,900  4/1977  Katsurayana ..................... 360/96.6

FOREIGN PATENT DOCUMENTS 2027973  2/1980  United Kingdom .............. 360/96.6

Primary Examiner—Robert S. Tupper
Attorney, Agent, or Firm—Keith D. Beecher

[57] ABSTRACT

An ejector mechanism for unloading the cassette from a cassette-type magnetic tape recorder is provided. The mechanism includes a slide actuator which is mounted in an opening in the housing of the unit for reciprocal rectilinear movement in the plane of the housing, with both the housing and the actuator preferably being composed of a suitable plastic material. The slide actuator includes an integral portion which depends through the opening from the under side of the actuator in position to engage and move a spring-loaded slider on the chassis of the unit from a first to a second position against the bias of its spring. As the slider is moved from its first to its second position, a spring-biased ejector lever under the cassette is released and moves angularly upwardly from a lower position to an upper position to eject the cassette. As the ejector lever moves angularly to its upper position, it latches the slider in its second position. When the cassette is again inserted into the unit, it presses the ejector lever back down to its lower position, which unlatches the slider and causes it to move back to its first position, at which position the slider holds the ejector lever down in its lower position, until the slide actuator is again operated.

6 Claims, 6 Drawing Figures

CASSETTE EJECTOR MECHANISM

This application is a continuation-in-part of copending application Ser. No. 202,785, filed Oct. 31, 1980, and now abandoned.

BACKGROUND

Many different types of tape transports for magnetic tape recorders are known. The most popular today is the cassette-type, in which the supply spool and the take-up spool and the magnetic tape itself are all contained in a flat housing, the housing being inserted into the tape recorder and being ejected from the tape recorder at will. Tape recorders using such cassettes are presently in widespread use, mainly because the tape is protected in the cassette housing, and the cassettes are easy to handle. Accordingly, as the art has progressed, many holders, loaders and ejectors for the cassettes have been proposed in conjunction with magnetic tape recorders. Typical cassette holders, loaders and ejectors are disclosed, for example, in U.S. Pat. Nos. 3,669,457; 3,896,492; 3,950,787 and 3,996,618.

The present invention is concerned with a simplified cassette holder in a magnetic tape recorder, and more particularly with an improved and simplified ejector mechanism for the cassette. In the embodiment to be described, a tape transport is provided which includes a chassis which incorporates a holder for the cassette, and a manually operated mechanism for ejecting the cassette from the holder. The ejector mechanism includes a slide actuator member which is slidably mounted on the housing of the unit, and which is moved manually to eject the cassette. The sub-assembly of the housing and the slide actuator represents a cost effective feature in that the actuator may be inserted into an opening in the housing during manufacture, to constitute an integrated sub-assembly with the housing. The slide actuator is configured to form a closure for the opening in the housing, and no screws or other fasteners are required in the mounting of the slide actuator on the housing.

The ejector mechanism itself is eminently simple, in that movement of the slide actuator causes the spring-loaded slider on the chassis to move against its spring bias to release a spring-loaded ejector lever under the cassette. The lever turns upwardly to eject the cassette, and also to latch the slider in its displaced position. Then, when a cassette is again inserted into the tape transport, it moves the ejector lever down against its spring bias to release the slider, and the slider then acts to latch the ejector lever in its down position in a manner in which it does not contact the cassette until the slide actuator is again operated.

DETAILED DESCRIPTION OF THE ILLUSTRATED EMBODIMENT

Figure 1:
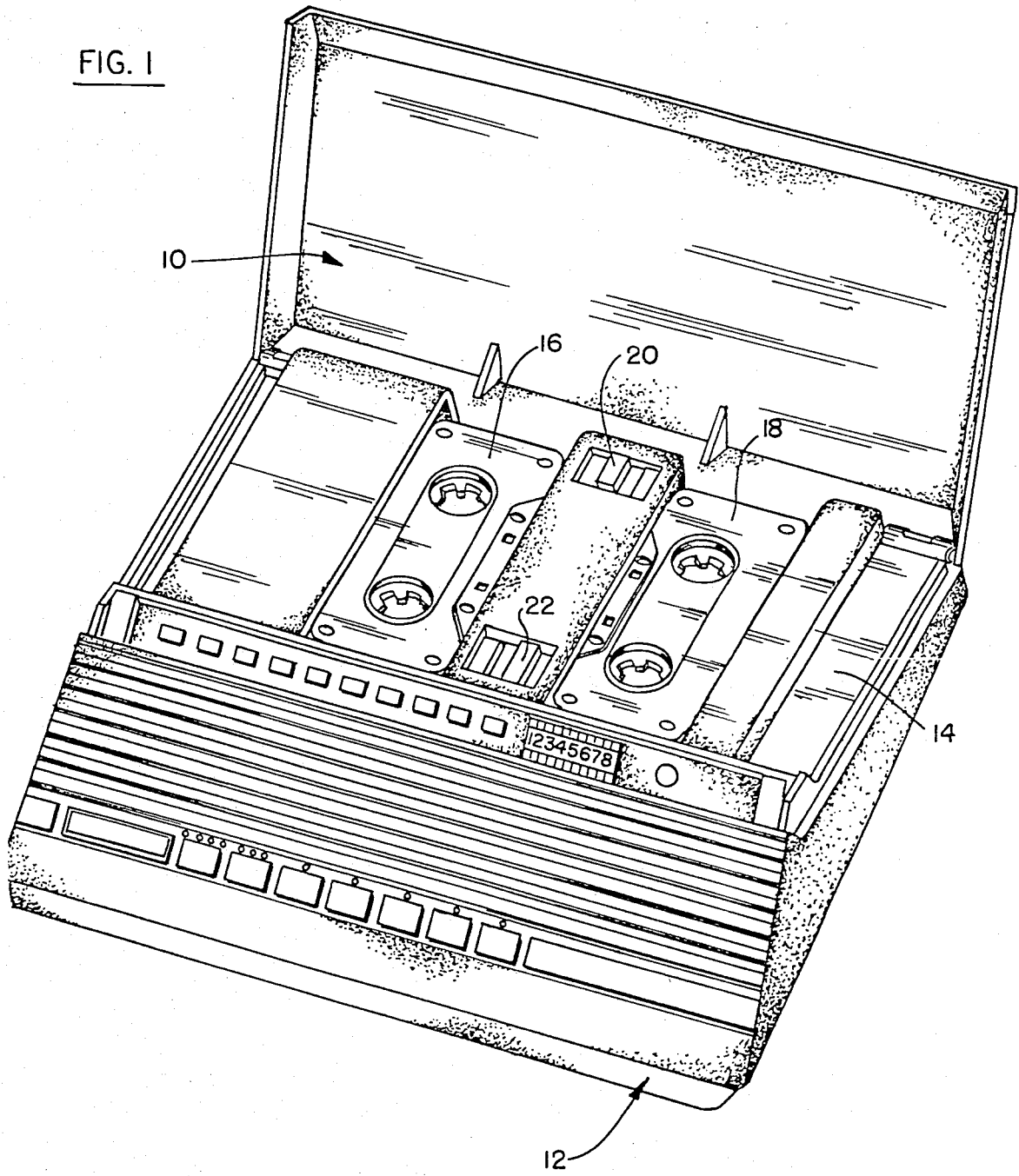
FIG. 1 is a perspective representation of a telephone answering unit which incorporates a cassette-type tape recorder in which the mechanism of the present invention is incorporated.

The telephone answering system shown in FIG. 1 includes a housing having an upper section 14 and a lower section 12 with a cover 10, with various operating controls being mounted in the housing to permit the unit properly to perform its intended function of automatically answering a telephone. Since the overall operation of the telephone answering unit does not form a part of the present invention, a detailed description of the operating components is deemed to be unnecessary. The view of FIG. 1 also shows a pair of cassettes 16 and 18 supported on upper section housing 14. Also mounted on the upper section housing 14 are a pair of slide actuators 20, 22 which are independently manually operated, to release the cassettes 16 and 18.

Figure 2:
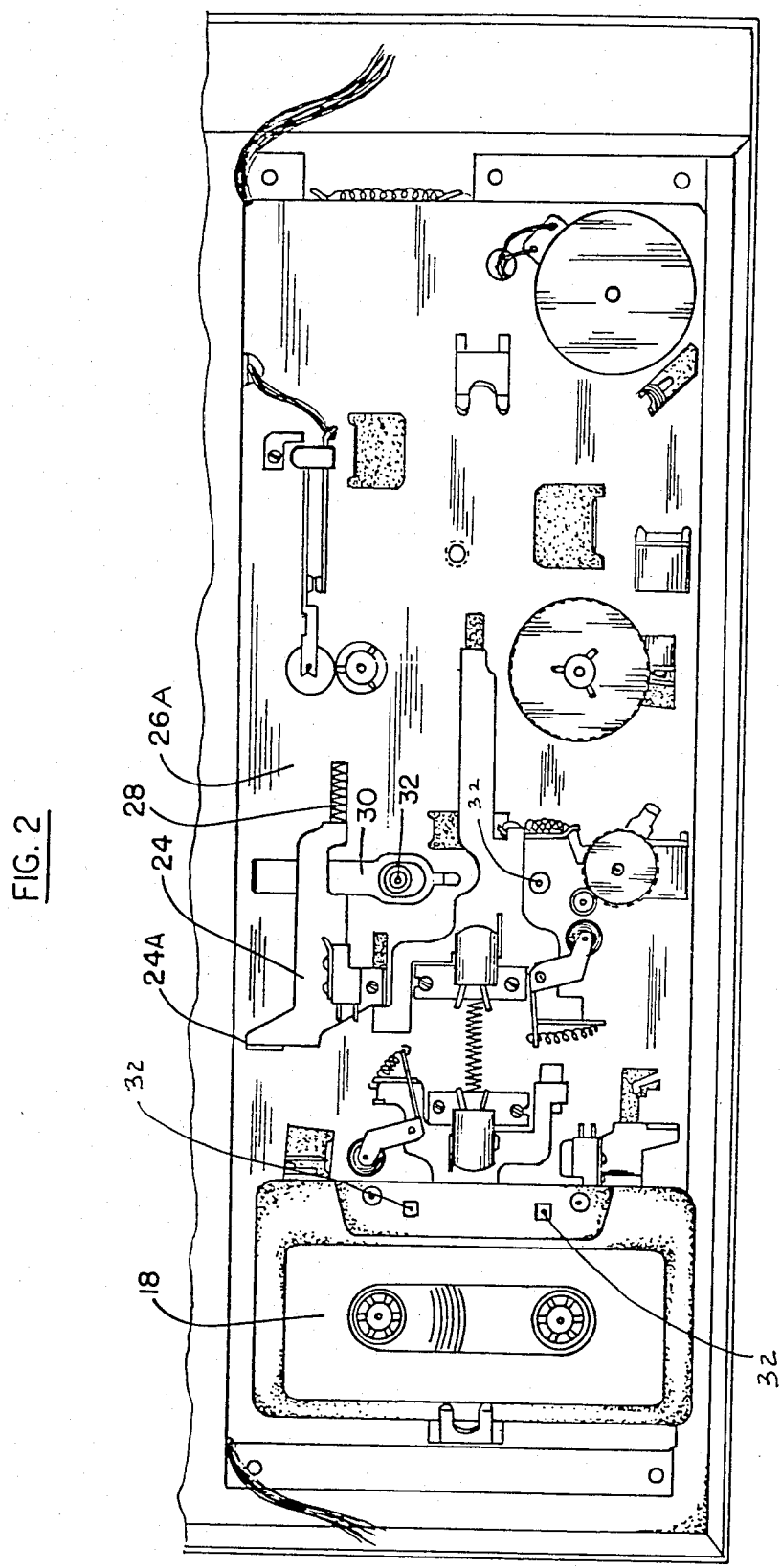
FIG. 2 is a top view of the unit, like FIG. 1, but with the upper housing removed, to reveal the internal chassis of the unit, and certain of the operating components which are mounted on the chassis.
Figure 3:
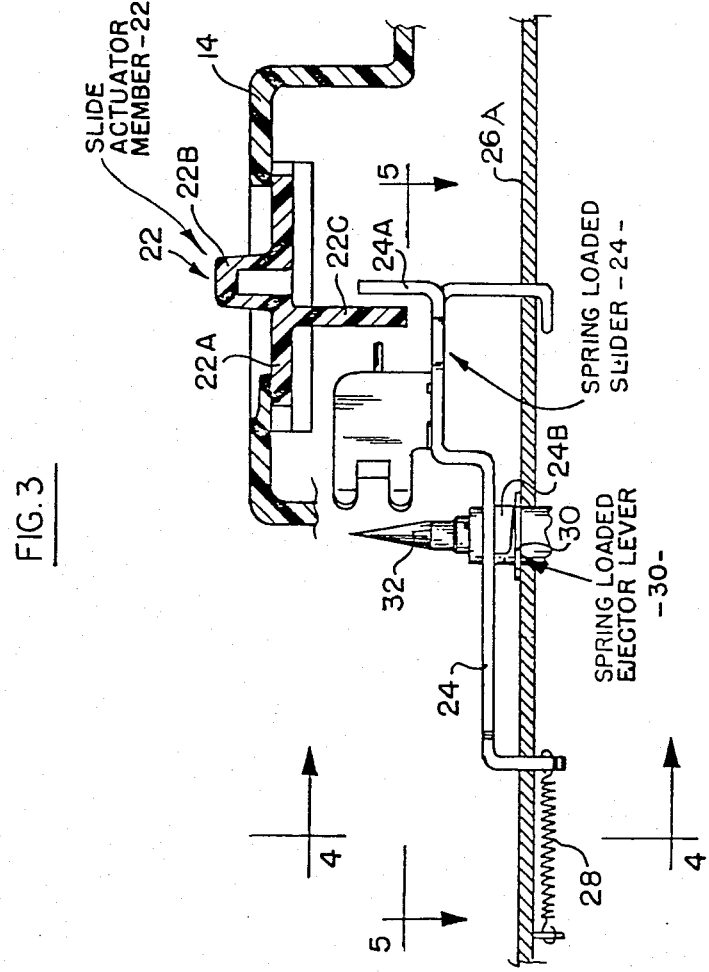
FIG. 3 is a partially sectional view showing one of the slide actuator members of FIG. 1, and the manner in which it engages certain components of a cassette ejector mechanism which is mounted on the chassis.

As shown in FIGS. 2 and 3, a chassis 26 is mounted within lower section 12 of the housing which defines a top deck 26A, and a slide member 24 is mounted on the chassis 26 for reciprocal rectilinear movement above deck 26A between a first position and a second position along a path parallel to the top surface of the deck. The slide member 24 is spring-biased towards its first position by a spring 28. It will be appreciated that a similar ejector mechanism is mounted on the chassis 26 for each of the cassettes 16 and 18. The slide mechanism in FIG. 3 is shown as being operated by the slide actuator member 22, it being understood that the slide actuator member 20 operates a similar mechanism.

Figure 6:
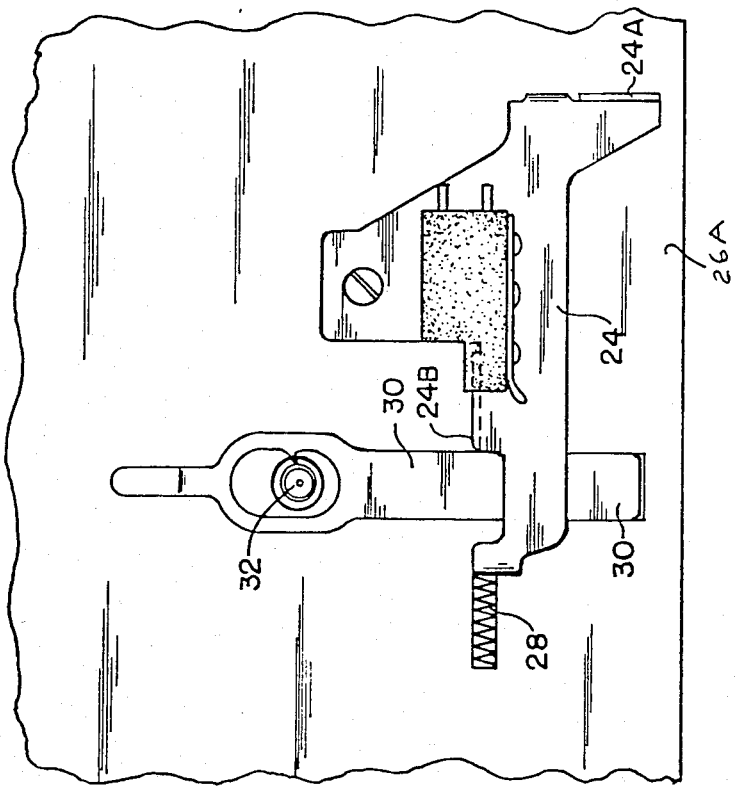
FIG. 6 is a view, like FIG. 5, but showing the ejector mechanism in a second of its operational positions.

As illustrated in FIG. 3, the slide actuator member 22 is mounted in an opening in upper section housing 14 for slidable movement to the left and right in FIG. 3 in the plane of the cover. The actuator has a web-like portion 22A which encloses the opening in the upper section housing for all positions of the slider. Also, an integral portion 22B extends transversely across the upper side of the actuator and upwardly through the opening to provide a means for manually moving the actuator back and forth in the opening. A further portion 22C depends from the under side of the actuator, and the portion 22C extends downwardly to be adjacent an upwardly extending portion 24A of slide member 24. The construction is such that when the slide actuator 22 is moved to the right in FIG. 3, the depending portion 22C engages the portion 24A of slide member 24, so that the slide member, likewise, is moved to the right in FIG. 3 against the force of spring 28. The ejector mechanism also includes an ejector lever 30 which extends through a slot in deck 26A (FIG. 4), and which is biased in a clockwise direction by a spring 27, with the slot providing the pivot axis for the lever. The left hand distal end of the ejector lever (FIG. 4) is located under the corresponding cassette (not shown) and the ejector lever 30 extends transversely under the slider member 24. Lever 30 has an opening in its distal end which surrounds a locating pin 32 for the cassette (FIG. 2). The ejector lever 30 is spring-loaded by spring 27 to its position of FIG. 4, at which it is inclined to the deck 26A of chassis 26. However, when the ejector lever is turned down into the plane of deck 26A when a cassette is manually loaded on the deck and is pressed down onto locator pin 32, the slider member 24 is released from the position of FIGS. 4 and 5 and is biased by spring 28 to the position of FIGS. 3 and 6. When the slide member is in the latter position, its depending portion 24B holds the ejector lever 30 down against the bias of spring 27 against the top surface of deck 26A of chassis 26 as shown in FIGS. 3 and 6. It should be noted that the shape of the depending portion 24B is such that when the slide member 24 is in its latter position, no portion of the ejector lever 30 contacts the cassette.

Figure 4:
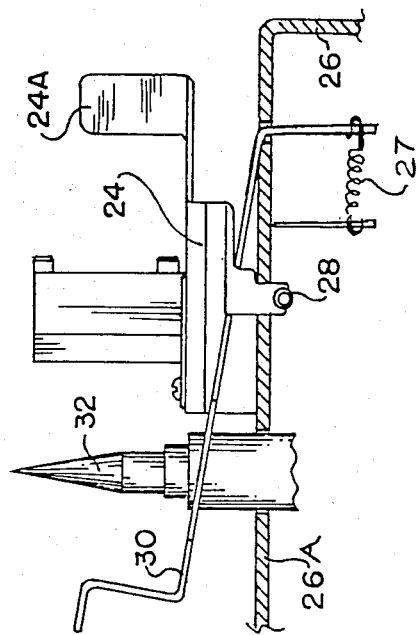
FIG. 4 is a partial sectional view taken essentially along the lines 4—4 of FIG. 3, and showing various components of the cassette ejector mechanism.
Figure 5:
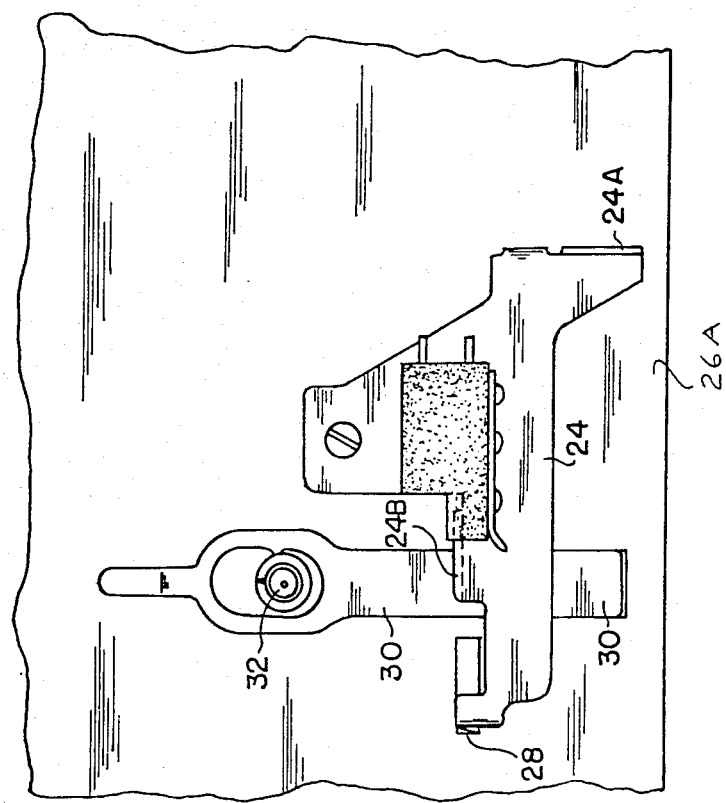
FIG. 5 is a fragmentary view taken along the lines 5—5 of FIG. 3 and showing the cassette ejector mechanism in one of its operational positions.

As shown in FIGS. 4 and 5, when the ejector lever 30 is released, and has moved angularly to its inclined position to eject the cassette, it latches against depending portion 24B of the slider member 24, and holds the slider member in its position of FIGS. 4 and 5 against the bias of spring 28. However, when the distal end of ejector lever 30 is moved down against the top surface of deck 26A as the cassette is inserted onto the tape transport, it releases the slide member and the slide member moves to the position shown in FIGS. 3 and 6 by the force of spring 28. In this position as shown in FIG. 3, the ejector lever 30 does not contact the cassette.

Therefore, when a cassette is loaded onto the tape transport, the distal end of ejector lever 30 is moved down against the top surface of deck 26A, and the slide member 24 is released and is moved by spring 28 to the position shown in FIGS. 3 and 6. During that condition of the ejector mechanism, the cassette is mounted on the tape transport, and is operational, and without any force from ejector lever 30 acting upon it.

To release the cassette, the slide actuator member 22 is moved to the right in FIG. 3, which serves to draw the slide member 24 to the right in FIG. 3, thereby releasing the ejector lever to its inclined position under the bias of spring 27 to eject the cassette which is mounted over the ejector lever on the locator pin 32. The ejector lever now latches the slide member 24 in its second position, and the cassette may be removed.

When the cassette is again inserted into the tape recorder, it is moved down over locator pin 32 and over ejector lever 30, which causes the distal end of ejector lever 30 to turn against the top surface of deck 26A, thereby releasing the slide member 24. Slide member 24 now is moved to the position of FIGS. 3 and 6 by spring 28, and its depending portion 24B now serves to latch the distal end of ejector lever 30 down against the top surface of deck 26A, and in a manner so that no contact is made by the distal end of ejector lever 30 against the cassette. Therefore, the cassette is retained in the tape recorder in its operating position, until again released, by moving the slide actuator member 22 to the right in FIG. 3.

As described, in one operational position of the ejector mechanism, ejector lever 30 serves to latch slide member 24 against the bias of its spring 28; and in a second operational position of the ejector mechanism slide member 24 serves to latch ejector lever 30 against the bias of its spring 27.

The invention provides, therefore, an eminently simple ejector mechanism by which cassettes may be ejected from tape recorders by a simple movement of a slide actuator which is mounted in the cover of the unit as a sub-assembly during the manufacture of the unit.

It will be appreciated that while a particular embodiment of the invention has been shown and described, modifications may be made. It is intended in the claims to cover the modifications which come within the true spirit and scope of the invention.

What is claimed is:

1. An ejector mechanism for unloading a cassette from a magnetic tape recorder, said recorder including a chassis having a top deck and a housing enclosing the chassis, and means for mounting a cassette in the magnetic tape recorder in an operative position on the surface of said top deck, said ejector mechanism including: an ejector lever mounted on said chassis and extending through a slot in said top deck for angular movement between an inclined position in which its distal end is displaced from the surface of said deck to a position in which said distal end is moved against the surface of said deck; first spring means coupled to said chassis and to the other end of said ejector lever for biasing said ejector lever to its inclined position; a slide member mounted on said chassis for reciprocal rectilinear movement along a path displaced from the surface of said deck between a first position and a second position; second spring means coupled to said chassis and to said slide member for biasing said slide member to said first position, said slide member extending across said ejector lever and serving to latch the distal end of said ejector lever against the surface of said deck when said slide member is in its first position and to release said ejector lever to its inclined position when said slide member is moved to its second position, and said ejector lever serving to latch said slide member in its second position when said ejector lever is released to its incliend position, said ejector lever being positioned to engage the cassette so as to eject the cassette from the surface of said deck when the ejector lever is released to its inclined position, and to enable the cassette to move the distal end of the ejector lever back towards the surface of said deck to be latched by said slide member when the cassette is manually inserted into the tape recorder and moved towards the surface of said top deck; and a slide actuating member movably mounted on said housing having a portion in position to engage said slide member to move the slide member from its first position to its second position so as to release said ejector lever to its inclined position when said slide actuating member is operated.

2. The ejector mechanism defined in claim 1, in which said slide actuating member is slidably mounted in an opening in said housing, and has a projecting transverse portion extending through said opening to the exterior of said housing to permit manual operation of the slide actuating member.

3. The ejector mechanism defined in claim 2, in which said slide actuating member has a web-like portion serving as a closure for the opening in said housing for all positions of the slide actuating member.

4. The ejector mechanism defined in claim 3, in which the housing and the slide actuating member are formed of plastic material.

5. The ejector mechanism defined in claim 1, and which includes a locator pin for the cassette extending outwardly from said deck, and in which said ejector lever has an opening therein to receive said locator pin.

6. An ejector mechanism for unloading a cassette from a magnetic tape recorder, said recorder including a deck and further including means for mounting a cassette in an operative position on said deck, said ejector mechanism including: an ejector lever mounted on said deck for angular movement between an inclined first position in which one end thereof is displaced up from the plane of the deck and a second position in which said one end is moved down to the plane of the deck; first spring means connected to the deck and to the ejector lever for biasing the ejector lever to its inclined position; a slide member mounted on the deck for reciprocal rectilinear movement with respect to the deck between a first position in which said slide member extends across said ejector lever to latch said ejector lever in its second position, and a second position to release said ejector lever to its inclined position, said ejector lever serving to latch said slide member in its second position when said ejector lever is released to its inclined position; and second spring means connected to the deck and to said slide member for biasing said slide member to its first position, said ejector lever being positioned to engage the cassette so as to eject the cassette when the ejector lever is released to its inclined position, and to enable the cassette to move the ejector lever to its second position to be latched by said slide member when the cassette is manually inserted into the tape recorder.

* * * * *